United States Patent
Rivest

(10) Patent No.: US 9,140,392 B2
(45) Date of Patent: Sep. 22, 2015

(54) FITTING FOR TUBING CONTAINMENT SYSTEM

(71) Applicant: Omega Flex, Inc., Middletown, CT (US)

(72) Inventor: Dean W. Rivest, Oxford, PA (US)

(73) Assignee: OMEGA FLEX, INC., Middletown, CT (US)

(*) Notice: Subject to any disclaimer, the term of this patent is extended or adjusted under 35 U.S.C. 154(b) by 85 days.

(21) Appl. No.: 13/860,652

(22) Filed: Apr. 11, 2013

(65) Prior Publication Data

US 2014/0306448 A1    Oct. 16, 2014

(51) Int. Cl.
| F16L 33/00 | (2006.01) |
| F16L 25/00 | (2006.01) |
| F16L 33/22 | (2006.01) |
| F16L 39/02 | (2006.01) |
| G01M 3/28 | (2006.01) |

(52) U.S. Cl.
CPC ........... *F16L 25/0036* (2013.01); *F16L 33/224* (2013.01); *F16L 39/02* (2013.01); *G01M 3/283* (2013.01); *F16L 2201/30* (2013.01)

(58) Field of Classification Search
USPC .......................................... 285/249, 255, 903
See application file for complete search history.

(56) References Cited

U.S. PATENT DOCUMENTS

| 2,241,245 | A | * | 5/1941 | Daniels | 285/903 |
| 3,008,736 | A | * | 11/1961 | Samiran | 285/249 |
| 3,189,370 | A | * | 6/1965 | Marshail | 285/255 |
| 4,674,775 | A | * | 6/1987 | Tajima et al. | 285/903 |
| 4,875,720 | A | * | 10/1989 | Sasa et al. | 285/249 |
| 4,904,002 | A | * | 2/1990 | Sasa et al. | 285/903 |
| 5,080,405 | A | * | 1/1992 | Sasa et al. | 285/903 |
| 5,261,707 | A | * | 11/1993 | Kotake et al. | 285/903 |
| 5,292,156 | A | * | 3/1994 | Sasa et al. | 285/903 |
| 5,423,578 | A | * | 6/1995 | Kanomata et al. | 285/903 |
| 5,441,312 | A | * | 8/1995 | Fujiyoshi et al. | 285/903 |
| 5,582,439 | A | * | 12/1996 | Spears | 285/423 |
| 5,799,989 | A |   | 9/1998 | Albino |  |
| 5,857,716 | A | * | 1/1999 | Thomas | 285/903 |
| 6,019,399 | A |   | 2/2000 | Sweeney |  |
| 6,079,749 | A |   | 6/2000 | Albino et al. |  |
| 6,428,052 | B1 |  | 8/2002 | Albino et al. |  |
| 6,502,866 | B1 | * | 1/2003 | Hujisawa et al. | 285/249 |
| 6,877,781 | B2 | * | 4/2005 | Edler | 285/903 |
| 6,908,114 | B2 | * | 6/2005 | Moner | 285/249 |
| 7,004,510 | B2 | * | 2/2006 | Treichel | 285/903 |
| 7,055,868 | B2 | * | 6/2006 | Watanabe | 285/249 |
| 7,607,700 | B2 | * | 10/2009 | Duquette et al. | 285/903 |
| 7,621,567 | B2 | * | 11/2009 | Duquette et al. | 285/903 |

(Continued)

OTHER PUBLICATIONS

International Search Report application PCT/US2014/033253, mailed Sep. 23, 2014, 6 pages.

(Continued)

*Primary Examiner* — David E Bochna
(74) *Attorney, Agent, or Firm* — Cantor Colburn LLP

(57) ABSTRACT

A fitting for use with metal tubing includes an adaptor, the adaptor having a longitudinal passage having a longitudinal axis for fluid flow; a body for receiving the tubing, the body positioned opposite the adaptor and aligned with the longitudinal axis; a metal sealing member positioned between the adaptor and the body; a nut positioned opposite the body; a jacket lock ring positioned radially inwardly of a portion of the nut, the jacket lock ring for making a mechanical connection with an outer jacket of the tubing; and at least one fastener coupling the nut, body and adapter.

13 Claims, 4 Drawing Sheets

(56) References Cited

U.S. PATENT DOCUMENTS

| | | | |
|---|---|---|---|
| 7,690,693 B2 * | 4/2010 | Moner et al. | 285/249 |
| 7,690,695 B2 * | 4/2010 | Duquette et al. | 285/249 |
| 7,857,358 B2 | 12/2010 | Rolland et al. | |
| 7,980,601 B2 * | 7/2011 | Oh | 285/903 |
| 2010/0117358 A1 | 5/2010 | Treichel et al. | |
| 2011/0215570 A1 | 9/2011 | Treichel et al. | |

OTHER PUBLICATIONS

Written Opinion for application PCT/US2014/033253, mailed Sep. 23, 2014, 4 pages.

* cited by examiner

FITTING FOR TUBING CONTAINMENT SYSTEM

BACKGROUND OF THE INVENTION

Embodiments relate generally to tubing systems and in particular to a fitting for use with a double containment tubing system. Currently, flexible tubing, such as corrugated stainless steel tubing, is used in a number of applications requiring primary and secondary containment. Various plumbing, as well as local and federal, mechanical codes and specifications require that certain types of installations of flexible tubing be protected by a secondary containment system. Tubing containment systems exist in the art to contain fluids if the tubing leaks. One existing double containment tubing system is disclosed in U.S. Pat. No. 7,857,358, the entire contents of which are incorporated herein by reference.

SUMMARY

Embodiments include a fitting for use with metal tubing includes an adaptor, the adaptor having a longitudinal passage having a longitudinal axis for fluid flow; a body for receiving the tubing, the body positioned opposite the adaptor and aligned with the longitudinal axis; a metal sealing member positioned between the adaptor and the body; a nut positioned opposite the body; a jacket lock ring positioned radially inwardly of a portion of the nut, the jacket lock ring for making a mechanical connection with an outer jacket of the tubing; and at least one fastener coupling the nut, body and adapter.

Embodiments also include a fitting-tubing assembly including metal tubing having peaks and valleys and an outer jacket; and a fitting secured to the tubing, the fitting including: an adaptor, the adaptor having a longitudinal passage having a longitudinal axis for fluid flow; a body for receiving the tubing, the body positioned opposite the adaptor and aligned with the longitudinal axis; a metal sealing member positioned between the adaptor and the body, the sealing member positioned in a valley of the tubing; a nut positioned opposite the body; a jacket lock ring positioned radially inwardly of a portion of the nut, the jacket lock ring making a mechanical connection with the outer jacket of the tubing; and at least one fastener coupling the nut, body and adapter.

Other exemplary embodiments are described herein, and encompassed by the appended claims.

DETAILED DESCRIPTION

Figure 1:
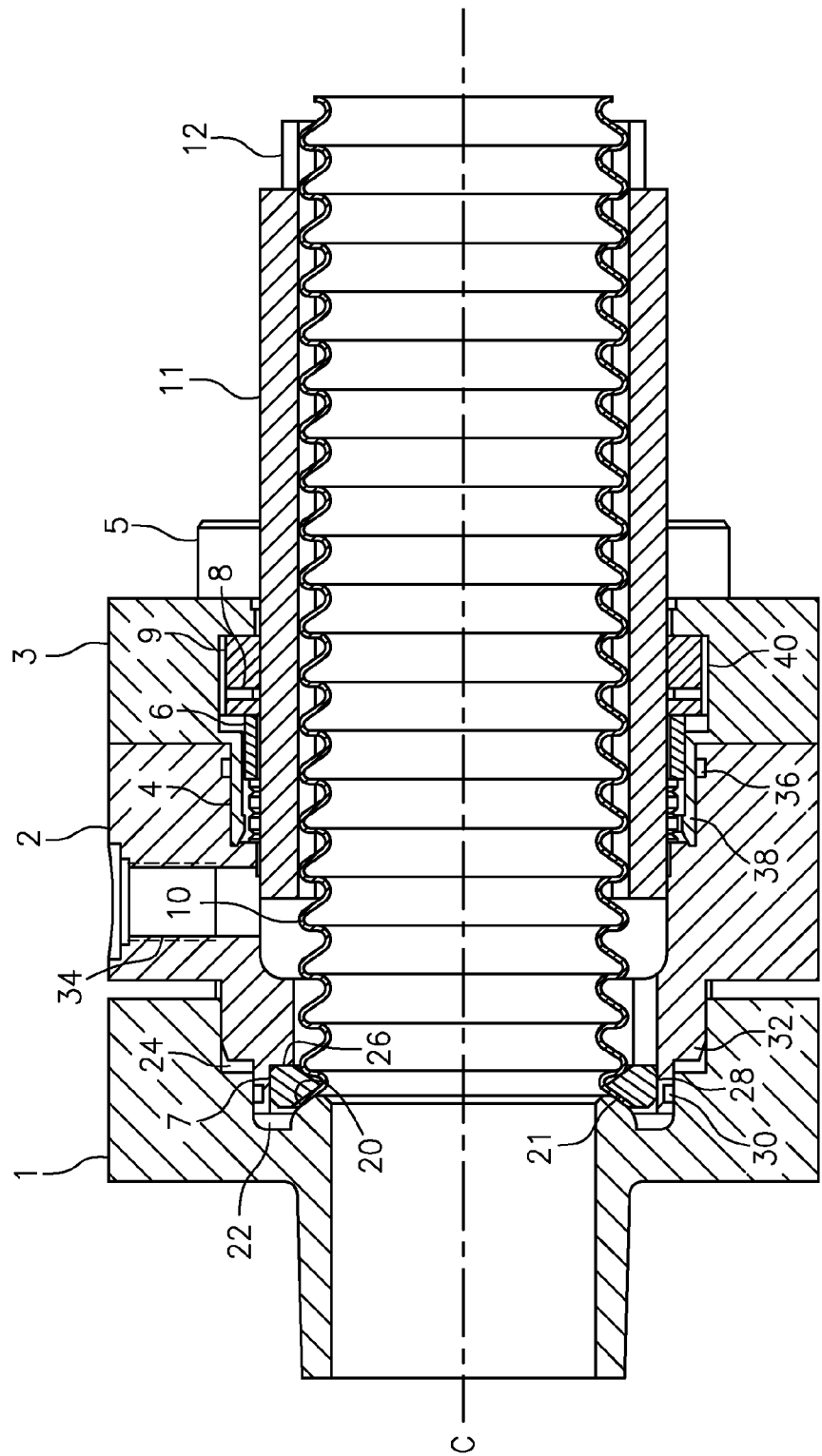
FIG. 1 is a cross-sectional view of a fitting and tubing in a closed state in an exemplary embodiment.

FIG. 1 is a cross-sectional view of a fitting and tubing in a closed state in an exemplary embodiment. The fitting includes an adaptor 1, a body 2 and a nut 3. Adaptor 1, body 2 and a nut 3 all in include a passage therethough formed along a central axis, C. The fitting forms a fluid tight seal on tubing 10 by compressing a portion of the tubing 10 between a sealing surface of sealing member 7 and an adaptor sealing surface of adaptor 1, as described in further detail herein.

Adaptor 1 has longitudinal passage along longitudinal axis, C, for fluid flow. Adaptor 1 is generally cylindrical and includes an annular, adaptor sealing surface 20 on an interior portion thereof, radially outward of central axis, C. Adaptor sealing surface 20 has a rounded or radiused surface that contacts tubing 10. An annular pocket 22 is formed in adaptor 1 radially outwardly of adaptor sealing surface 20. Pocket 22 receives a rib 28 of body 2. An annular recess 24 is formed in adaptor 1 radially outwardly of pocket 22. Recess 22 receives an outer shoulder 32 of body 2.

Sealing member 7 is an annular element having a sealing surface 21 that faces adaptor sealing surface 20. Sealing surface 21 may be planar, and generally frusto-conical. Sealing member 7 may be a formed by split ring washers, a collet or other member.

Body 2 is generally cylindrical and includes an annular, inner shoulder 26 having a surface perpendicular to central axis, C. Inner shoulder 26 engages one side of sealing member 7. An annular rib 28 is formed radially outwardly of inner shoulder 26, parallel to central axis, C. Rib 28 is positioned radially outwardly of sealing member 7. Rib 28 includes a groove 30 on a radially outward face of rib 28. Annular groove 30 receives a seal, such as an o-ring, to form a fluid tight seal between body 2 and adaptor 1. An annular outer shoulder 32 is formed radially outwards of rib 28 and serves to align body 2 with adaptor 1. Outer shoulder 32 is received in recess 24.

Body 2 includes a vent opening 34 that extends through a wall of body 2 to provide fluid communication with the interior of body 2. Vent opening 34 provides for egress of fluid leaking from piping 10 and/or a port for monitoring of leaking fluid by sensors. Body also includes an annular groove 36 formed on a radially inward face of body 2, juxtaposed a finger 38 of nut 3. Groove 36 receives a seal, such as an o-ring, to form a fluid tight seal between body 2 and nut 3.

Nut 3 is generally cylindrical and includes an annular finger 38 positioned radially outwardly of a jacket lock ring 4. Jacket lock ring 4 is positioned on a rear end of the body 2 and engages the outer jacket 11 of tubing 10, The jacket lock ring 4 is received in an annular recess on the rear end of body 2 where outer jacket 11 enters the fitting. When fully assembled, finger 38 of nut 3 axially slides over jacket lock ring 4 thereby radially compressing jacket lock 4. A distal end of finger 38 may have an enlarged thickness to aid in driving jacket lock ring 4 into outer jacket 11. Jacket lock ring 4 includes interior barbs that engage the outer jacket 11.

An annular slide ring 6 is positioned between nut 3 and outer jacket 11. Slide ring 6 is radially inward of finger 38 and abuts jacket lock ring 4. Slide ring 6 serves to drive jacket lock ring 4 axially towards body 2. A washer 8 and elastomeric seal 9 may be positioned in an annular groove 40 on an interior surface of nut 3. Washer 8 and elastomeric seal 9 provide an enhanced seal between the nut 3 and the outer jacket 11. Slide ring 6 also pushes axially against washer 8 and elastomeric seal 9, thereby radially compressing elastomeric seal 9 creating a secondary seal on outer jacket 11.

Figure 2:
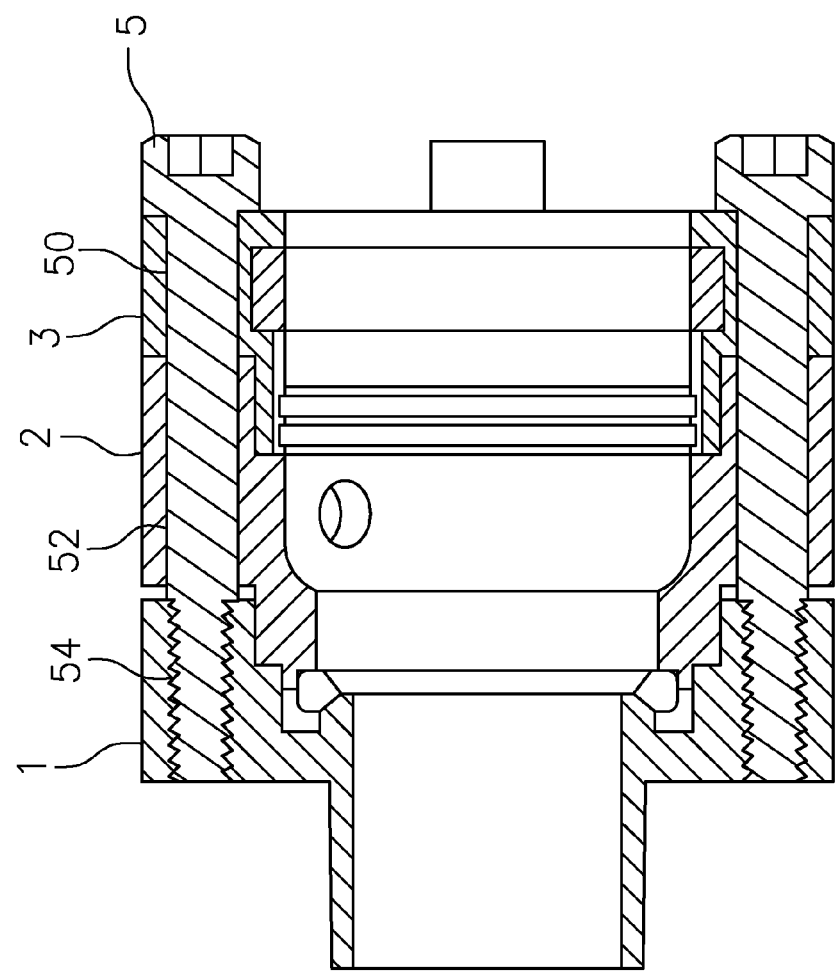
FIG. 2 is a cross-sectional view of a fitting in an exemplary embodiment.

As shown in FIG. 2, fasteners (e.g., cap screws) 5 slide through opening 50 in nut 3, opening 52 in body 2 and engage the threads 54 in adaptor 1. It is understood that threads may be formed on nut 3, rather than adaptor 1. As fasteners 5 are tightened, nut 3, body 2 and adaptor 1 are compressed together. Shoulder 26 of body 2 interacts with a sealing member 7 and adaptor 1 to compress corrugated tubing between the adaptor 1, body 2 and sealing member 7 to form a liquid tight seal. Adaptor sealing surface 20 is rounded a coacts with sealing surface 21 of sealing member 7. The use of a rounded adaptor sealing surface 20 and planar sealing surface 21 reduces the load required to create a liquid tight seal.

Figure 3:
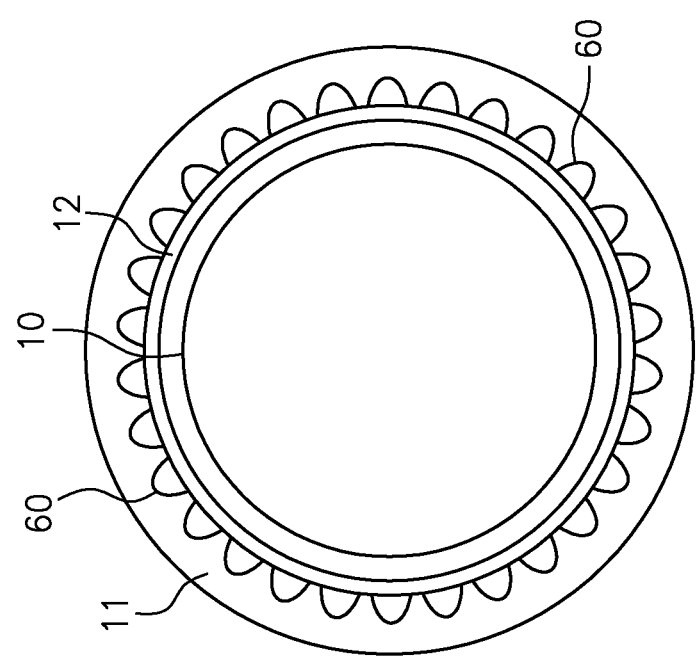
FIG. 3 is an end view of the tubing in an exemplary embodiment.

FIG. 3 is an end view of the tubing, comprising tubing 10, inner jacket 12, and outer jacket 11. The tubing 10 may be corrugated stainless steel. An inner jacket 12, manufactured from EFEP, for example, is positioned on the flexible tubing 10. An exemplary material for inner jacket 12 is a fluoropolymer, available as RP-5000, from Daikin America. This material has the inherent properties of minimal permeation thus providing the secondary containment, this allows fluids (e.g., gas, liquid, etc.) to flow to ends of the outer jacket 11 for venting as described in U.S. Pat. No. 7,857,358. An outer jacket 11 surrounds the inner jacket 12. An exemplary material for outer jacket 11 is Nylon 12 available as Vestamid X7297, product of Degussa. Contained in the inner diameter of outer jacket 11 are a number of ribs 60 separated by spaces. The ribs 60 are longitudinal and run the length of outer jacket 11. Ribs 60 in FIG. 3 are triangular in cross-section, but it is understood that other geometries may be used. In one embodiment, the fluid transported by tubing 10 is gasoline or diesel. In the event that tubing 10 leaks, fluids travel along spaces between ribs for venting through vent opening in body 2. As described in U.S. Pat. No. 7,004,510, a sensor may be coupled to the vent opening 34 in body 2 to detect fluid leaks and signal such an event.

Figure 4:
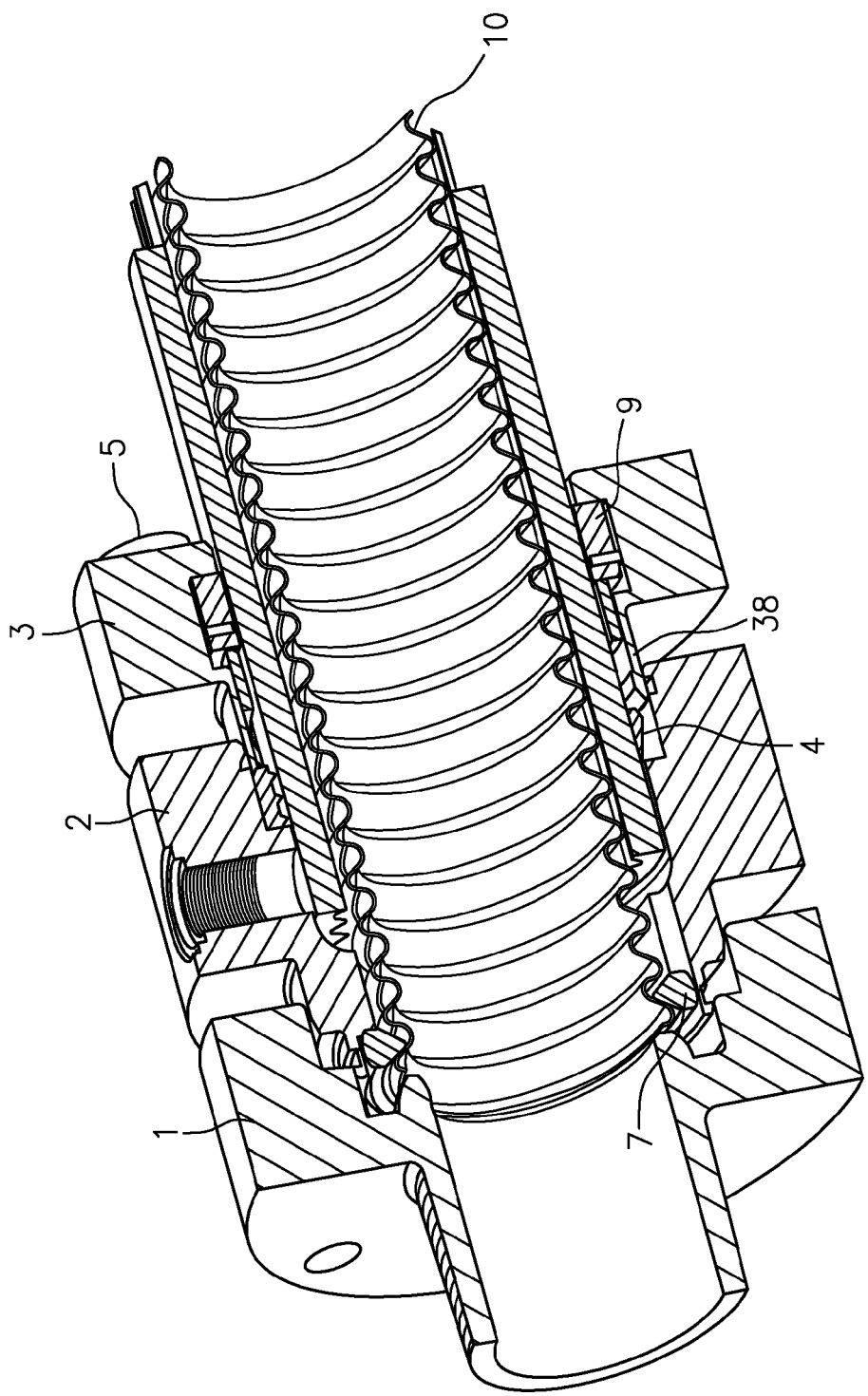
FIG. 4 is a perspective, cross-section view of an exemplary fitting and tubing in an open state in an exemplary embodiment.

FIG. 4 illustrates the fitting in an open or unassembled stated. Tubing 10 includes a number of peaks and valleys. Tubing 10 is cut in a valley and the inner jacket 12 and outer jacket 11 are removed, exposing about 4 peaks of tubing 10. Nut 3 and body 2 are placed over the outer jacket 11 so that tubing 10 extends beyond body 2. Sealing member 7 is placed in a first valley at the distal end of tubing 10 and then adaptor 1 is placed over the end of tubing 10. As fasteners 5 are tightened, body 3, nut 2 and adaptor 1 are compressed axially along axis, C. The peak of tubing 10 is compressed between adaptor sealing surface 20 and sealing surface 21 of sealing member 7. This compresses a double layer of tubing 10 between adaptor sealing surface 20 and sealing surface 21 of sealing member 7 for a fluid tight seal. Also, as nut 3 is driven into body 2, finger 38 drives jacket lock ring 4 into outer jacket 11. This provides a mechanical attachment between the fitting and the tubing to control axial extension of the fitting under pressure. Also, slide ring 6 applies axial pressure against elastomeric seal 9, thereby radially compressing elastomeric seal 9 creating a secondary seal on outer jacket 11.

The above-described fitting and tubing provides a double containment self-venting feature and a jacket lock. By virtue of the jacket lock 4 and nut 3, the fitting makes the outer jacket 11 a structural member of the joint, that is, axial extension under pressure is eliminated with this fitting.

One benefit of the fitting disclosed herein is that the fitting may be reused. Referring to FIG. 4, fasteners 5 may be removed from nut 3, body 2 and adaptor 1 to allow the fitting to be removed from tubing 10. The fitting may then be re-used with no loss of sealing or containment ability.

The tubing containment system may be used in a number of applications including direct underground burial, above ground outdoor use, indoor use at elevated pressure for safety and/or other secondary containment and sensing systems for petrochemical lines.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A fitting for use with metal tubing, the fitting comprising:
an adaptor, the adaptor having a longitudinal passage having a longitudinal axis for fluid flow;
a body for receiving the tubing, the body positioned opposite the adaptor and aligned with the longitudinal axis;
a metal sealing member positioned between the adaptor and the body;
a nut positioned opposite the body;
a jacket lock ring positioned radially inwardly of a portion of the nut, the jacket lock ring for making a mechanical connection with an outer jacket of the tubing; and
at least one fastener coupling the nut, body and adapter;
wherein the body includes an annular rib, the rib received in an annular pocket of the adaptor;
wherein the rib extends from an inner shoulder on the body, the sealing member placed against the inner shoulder.

2. The fitting of claim 1 wherein:
the adaptor includes an adaptor sealing surface, the adaptor sealing surface coacting with a sealing surface of the sealing member to compress tubing therebetween.

3. The fitting of claim 2 wherein:
the adaptor sealing surface is rounded.

4. The fitting of claim 1 wherein:
the adaptor includes an annular recess radially outward of the pocket;
the body includes an annular outer shoulder radially outward of the rib;
the recess receiving the outer shoulder to align the body with the adaptor.

5. The fitting of claim 1 wherein:
the fitting is reusable.

6. A fitting for use with metal tubing, the fitting comprising:
an adaptor, the adaptor having a longitudinal passage having a longitudinal axis for fluid flow;
a body for receiving the tubing, the body positioned opposite the adaptor and aligned with the longitudinal axis;
a metal sealing member positioned between the adaptor and the body;
a nut positioned opposite the body;
a jacket lock ring positioned radially inwardly of a portion of the nut, the jacket lock ring for making a mechanical connection with an outer jacket of the tubing; and
at least one fastener coupling the nut, body and adapter;
wherein the body includes an annular rib, the rib received in an annular pocket of the adaptor;
wherein the rib includes a groove on a radially outward surface thereof, the groove for receiving a sealing member to provide a seal between the body and the adaptor.

7. A fitting for use with metal tubing, the fitting comprising:
an adaptor, the adaptor having a longitudinal passage having a longitudinal axis for fluid flow;
a body for receiving the tubing, the body positioned opposite the adaptor and aligned with the longitudinal axis;
a metal sealing member positioned between the adaptor and the body;
a nut positioned opposite the body;
a jacket lock ring positioned radially inwardly of a portion of the nut, the jacket lock ring for making a mechanical connection with an outer jacket of the tubing; and
at least one fastener coupling the nut, body and adapter
wherein the body includes a vent opening formed through an annular wall of the body to provide fluid communication with an interior of the body.

8. A fitting for use with metal tubing, the fitting comprising:
an adaptor, the adaptor having a longitudinal passage having a longitudinal axis for fluid flow;

a body for receiving the tubing, the body positioned opposite the adaptor and aligned with the longitudinal axis;
a metal sealing member positioned between the adaptor and the body;
a nut positioned opposite the body;
a jacket lock ring positioned radially inwardly of a portion of the nut, the jacket lock ring for making a mechanical connection with an outer jacket of the tubing; and
at least one fastener coupling the nut, body and adapter;
wherein the body includes a groove on a radially inward surface thereof, the groove for receiving a sealing member to provide a seal between the body and the nut.

9. A fitting for use with metal tubing, the fitting comprising:
an adaptor, the adaptor having a longitudinal passage having a longitudinal axis for fluid flow;
a body for receiving the tubing, the body positioned opposite the adaptor and aligned with the longitudinal axis;
a metal sealing member positioned between the adaptor and the body;
a nut positioned opposite the body;
a jacket lock ring positioned radially inwardly of a portion of the nut, the jacket lock ring for making a mechanical connection with an outer jacket of the tubing; and
at least one fastener coupling the nut, body and adapter
wherein the nut includes an annular finger, the jacket lock ring being positioned radially inward of the finger.

10. The fitting of claim 9 wherein:
the finger includes a portion of increased thickness to direct the jacket lock ring radially inwardly towards the jacket.

11. The fitting of claim 9 further comprising:
a slide ring radially inward of the finger;
an elastomeric seal positioned at an interior of the nut;
the slide ring for compressing the elastomeric seal to seal against the interior of the nut.

12. The fitting of claim 9 wherein:
the tubing includes metal tubing having a plurality of peaks and valleys, an inner jacket and the outer jacket.

13. The fitting of claim 12 wherein:
the outer jacket has an interior surface opposite the inner jacket, the inner surface of the outer jacket being ribbed with a plurality of ribs extending longitudinally along the interior of the outer jacket.

\* \* \* \* \*